Sept. 6, 1966  C. H. BROWN ETAL  3,271,006
PORTABLE SERVICE LIFT

Filed July 6, 1962  2 Sheets-Sheet 1

INVENTORS
C. HUSTON BROWN
ROBERT J. HADDIX
BY
Dybvig & Dybvig
THEIR ATTORNEYS

Sept. 6, 1966   C. H. BROWN ETAL   3,271,006
PORTABLE SERVICE LIFT
Filed July 6, 1962   2 Sheets-Sheet 2
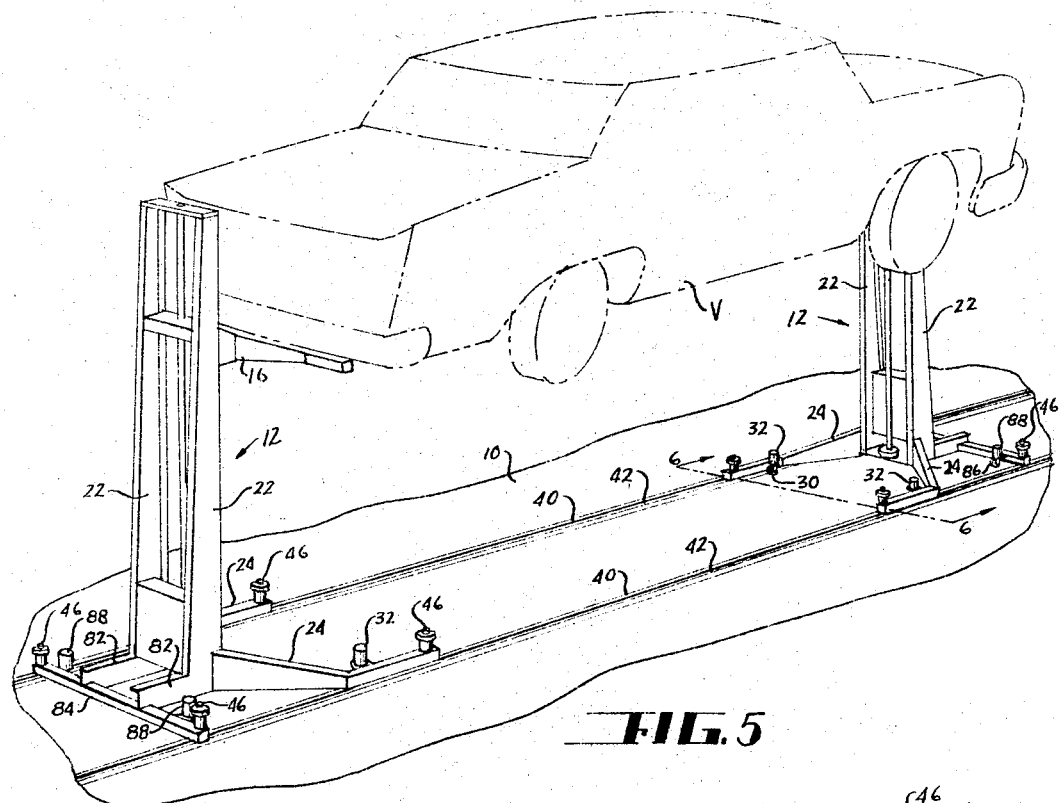
FIG. 5
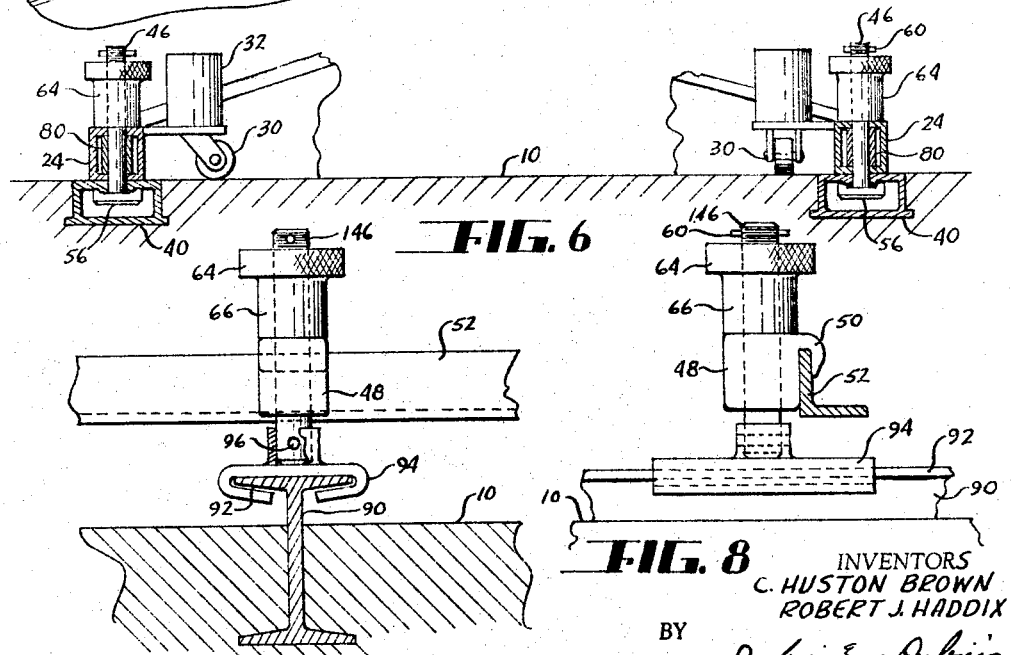
FIG. 6
FIG. 7
FIG. 8
INVENTORS
C. HUSTON BROWN
ROBERT J. HADDIX
BY
Dybvig & Dybvig
THEIR ATTORNEYS

United States Patent Office 3,271,006
Patented Sept. 6, 1966

3,271,006
PORTABLE SERVICE LIFT
Charles Huston Brown and Robert J. Haddix, Dayton, Ohio, assignors of one-third to said Brown, one-third to Ion V. K. Hott, and one-third to Warren E. Webster, all of Dayton, Ohio
Filed July 6, 1962, Ser. No. 208,015
3 Claims. (Cl. 254—2)

This invention relates to a lift and more particularly to a vehicle lifting system used to elevate a motor vehicle above the ground or other working surface so that repairs or maintenance may conveniently be accomplished on the underside of the vehicle.

An object of this invention is to provide an improved vehicle lifting system utilizing a pair of jacking units.

Another object of this invention is to provide a vehicle lifting apparatus which is portable but which may be clamped to a support surface or floor.

Another object of this invention is to provide a vehicle lift installation utilizing a pair of portable jacking units, each of which may be releasably secured to a floor.

A further object of this invention is the provision of a jacking unit and means releasably to secure the jacking unit to a floor such that the jacking unit may be releasably secured to the floor in any of several positions.

Other objects and advantages reside in the construction of parts, the combination thereof, the method of manufacture and the mode of operation, as will become more apparent from the following description.

Referring to the drawings:

FIGURE 5 is a perspective view of a lift installation made in accordance with a second embodiment of this invention.

FIGURE 6 is a sectional view of a portion of the base of one of the jacking units used in FIGURE 5 taken along line 6—6 thereof.

FIGURE 7 is a partial sectional view illustrating still another embodiment of this invention.

FIGURE 8 is a sectional view similar to FIGURE 3 of the embodiment of the invention of FIGURE 7 showing a releasable clamping unit in side elevational view.

Figure 1:
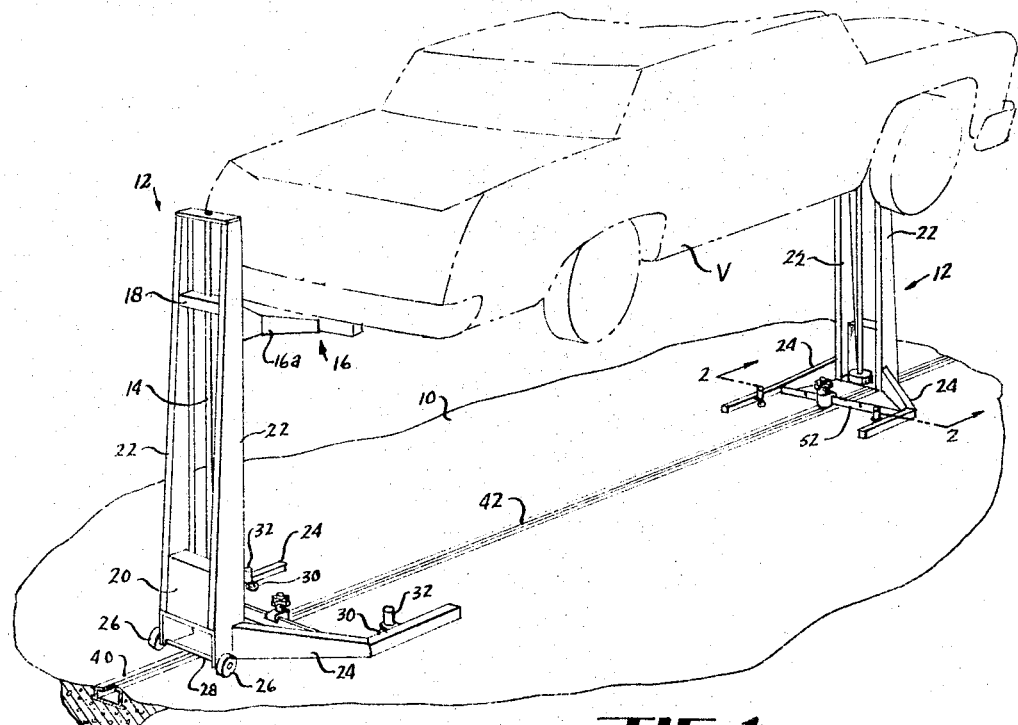
FIGURE 1 is a perspective view showing the presently preferred embodiment of a lift installation made in accordance with this invention employing a pair of jacking units.

Two types of vehicle lifting units available today are those units generally known as vehicle lifts and those known as jacks. Normally, a vehicle lift includes hydraulically or semi-hydraulically driven jacking units, one or more such units being disposed within a pit dug in the floor or earth. The hydraulically or semi-hydraulically driven jacking units are provided with superstructures having load engaging elements for engaging the wheels, the axles, the frame, or some other portion of the vehicles to be lifted. Units of this type are easily operated and perform quite satisfactorily. Consequently, these units are widely used in service stations, garages and the like for maintenance and repair of vehicle parts accessible from underneath vehicles. Installation of this type are normally permanent and are considered the most satisfactory vehicle lifting apparatus for permanent installations. However, initial installation of such units is expensive since a suitable pit must be dug and fluid lines must be directed through the floor or earth to provide for remote operation of the lift installation. In addition, repair or maintenance of such lifting apparatus is usually expensive and cumbersome because the parts within the ground are not easily accessible. The very fact that lift installations are permanent may be a drawback. In recent years, it has become commonplace to construct temporary structures for use in the repair or maintenance of vehicles. In some cases, the structures are so temporary that the installation of a typical vehicle lift is considered too expensive to be practical. Further, in some localities, because of rock beds and the like, the installation of typical vehicle lifts is prohibitively expensive.

Conventional vehicle jacks, on the other hand, normally are portable such that they may be moved from place to place. Usually, the term "jack" refers to a mechanism having only a limited rise and adapted to lift only a portion of an automobile, for example, to change tires. Recently, so-called "high-rise" jacks have been employed to take the place of the conventional permanent vehicle lifts of the type described above where installation of permanent lifts would be impractical. A "high rise" jack is usually portable and similar in construction to a conventional limited rise jack, but it has a rise of approximately sixty inches or more above the floor. Accordingly, a pair of high rise jacks may be used to engage opposite ends of a vehicle to lift it to substantially the same height as conventional vehicle lifts. High rise jacks have the advantage of cheaper initial cost and little or no installation cost. Also, since portable, they may be moved from place to place to be positioned where most convenient for raising vehicles. High rise jacks typically have relatively long, widely spaced legs or bases rendering them sufficiently stable when lifting a vehicle a considerable distance above the floor. Nonetheless, jacks of this type have not been as widely used as other types of vehicle lifting apparatus, probably because of the inherent instability of portable lifting equipment. Regardless of the size of its base, the danger is always present that a jack will not be placed upon a sufficiently flat surface or may not be properly aligned with the vehicle. Even if stable, many persons are unwilling to rely upon portable jacks to lift vehicles safely.

The term "jacking unit" is used herein to denote any type of portable device adapted to engage and lift a vehicle and includes either conventional limited rise jacks and "high rise" jacks. The invention is shown in the drawings in association with "high rise" jacks since it presently is believed that the invention will be most useful for use with such jacks.

In accordance with this invention, lift installations are provided utilizing portable jacking units with the addition of means releasably to clamp or secure the jacking units to the working surface or floor upon which they are positioned. In this way, adequate stability of the lifting apparatus is insured. At the same time, the jacking units are portable so that they may be moved from place to place should such be desired. The lift installations may be very simple. Clamp receiving members may be embedded within or upon the floor at a cost greatly below the normal cost of installation of conventional permanent hydraulic or semi-hydraulic vehicle lifts described earlier.

Referring now to FIGURES 1, 2, 3 and 4, the presently preferred embodiment of a vehicle lifting system made in accordance with this invention is shown as applied to a vehicle V, schematically shown in perspective view in FIGURE 1, elevated above a floor 10 by a pair of portable jacking units 12. The jacking units 12 may operate upon any of several well-known principles. For example, the units 12 may be commercially available hydraulic or pneumatic high rise jacks. The particular jacking units 12 shown in FIGURE 1 are shown only schematically and are high rise jacks of the type shown in application for United States Letters Patent, Serial No. 81,301, filed in the United States Patent Office on January 9, 1961, by Ion V. K. Hott and Warren E. Webster II, and assigned to the same assignees as the instant invention. Such a jacking unit comprises an elongate screw shaft, schematically shown at 14, upon which a carriage 16 is mounted for vertical movement. The screw shaft 14 and the carriage 16 are connected by a ball screw device (not shown) enclosed within a link 18 connected to the carriage 16. The screw shaft 14 may be rotatably driven in any suitable manner. For example, an electric motor may be housed within a housing 20 mounted between a pair of spaced stanchions 22 forming a portion of the frame for the jacking unit 12. As noted before, the drawings of the jacking unit 12 herein are schematic. It is intended that any type of jacking unit may be used which employs a carriage, such as that shown at 16, mounted for vertical movement on a frame, the carriage being driven in any suitable manner in a vertical direction to raise and lower a vehicle.

The base of each of the jacking units 12 may comprise a pair of support legs 24 attached to the lower portions of the stanchions 22. The legs 24 diverge outwardly from the stanchions 22 to span a sufficient area to stabilize the entire jacking unit. Each jacking unit is portable and for this purpose may be provided with a pair of rear wheels 26 mounted upon a shaft 28 journalled for rotation in aligned apertures adjacent the base of the stanchions 22. When the carriages 16 are not engaged with a vehicle, the jacking units 12 can be pivoted rearwardly about the wheels 26 and easily wheeled about to be positioned where desired. In addition to the wheels 26, the units 12 are supported by a pair of spring biased forward wheels or casters 30 provided on the forwardly extending portions of the legs 24. The casters 30 elevate the legs 24 above the surface 10 such that the jacking units 12 may conveniently be positioned accurately beneath the vehicle when in an upright position. However, the springs (not shown), which are located in the spring housings 32 attached to the legs 24, are overcome as the carriages 16 engage the vehicle, thus causing the legs 24 to come into flush engagement with the floor 10.

As already noted, the base 24 of each jacking unit 12 is sufficiently large to provide adequate stability for most uses. In addition, pivoted legs (not shown) may be attached to the legs 24 or to the bases of the stanchions 22 to provide even greater stability. Such pivoted legs are described in greater detail in the aforementioned patent application Serial No. 81,301. In accordance with this invention, the stability of the jacking units 12 is increased even further by providing mechanism for releasably clamping portions of the jacking units 12 to the floor 10 such that it is virtually impossible for the jacking units to be pivoted or tilted.

Figure 2:
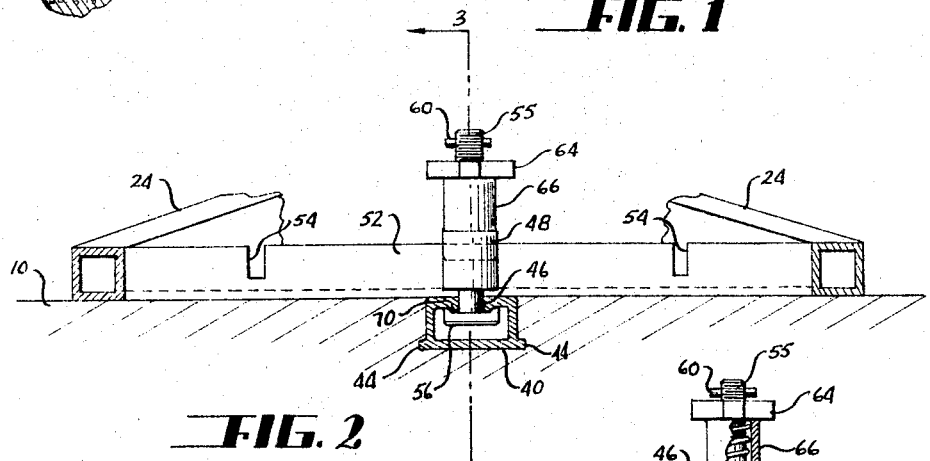
FIGURE 2 is a partial sectional view of the base of one of the jacking units taken along the line 2—2 of FIGURE 1.

The two jacking units 12 in FIGURE 1 are illustrated as positioned over an elongate, hollow, tubular box member 40 provided with a longitudinal slot 42 in the upper surface thereof. The member 40 forms a track embedded in the floor 10, which, for example, may be ground or a concrete slab. As shown in FIGURE 2, the tubular box member 40 is generally rectangular. A pair of longitudinal flanges 44 projecting outwardly from the bases thereof anchor it within the floor 10. This track or tubular box member 40 serves as a continuous clamp receiving element for receiving a clamping or locking member 46 mounted for vertical sliding movement within a movable support bracket or fixture 48 having a hook portion 50 slidably received upon an angle member or plate 52. The member 46 is described in greater detail below. As shown in FIGURES 1 and 2, the plate 52 is connected at its ends to the legs 24 of the jacking unit 12. A pair of vertical slots 54 are cut adjacent the end of each plate 52 so that sidearm portions 16a of the carriage 16 may lower therein. It is thus apparent that the fixture 48 may slide horizontally along the plate 52 between the sidearm portions 16a of the plate 16.

Each clamping or locking member 46 comprises a T-head bolt or rood having a threaded portion 55 at its upper end and a cross head or T-head 56 at its lower end. A pin 60 may be press-fit within the upper portion 55 in an aperture projecting therethrough having an axis parallel to the longitudinal axis of the head 56. As shown best in FIGURE 4, the member 46 is biased upwardly, so that its head 56 normally engages the base of the fixture 48, by means of a coil spring 62 encircling the upper end of the member 46. The spring 62 is held between the top of the fixture 48 and a spring housing or cap member 64 which has a hollow, cylindrical depending portion 66 encircling the spring 62. The upper portion of the housing 64 has a central threaded bore (not shown) threadedly engaged with the screw threaded portion 55 of the member 46.

Should it be desired to clamp or secure the jacking unit 12 to the floor 10, the T-head 56 is oriented such that its longitudinal axis is parallel to and directly above the longitudinal axis of the slot 42 within the box member 40. The member 46 is then pressed downwardly, whereupon the head 56 passes through the slot 42, and subsequently is rotated by 90° from the position shown in FIGURE 4 to that shown in FIGURES 2 and 3. The head 56, now located internally of the box member 40, straddles the slot 42. Throughout this clamping operation, the orientation of the T-head 56 can be determined by inspection of the pin 60.

Figures 3, 4:
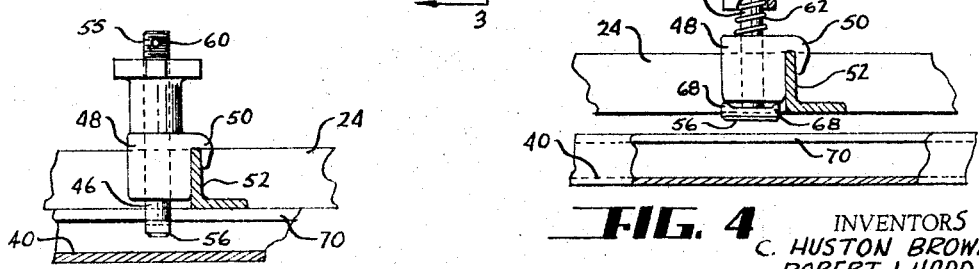
FIGURE 3 is a partial sectional view of the base of the jacking unit taken along the line 3—3 of FIGURE 2.
FIGURE 4 is a view similar to FIGURE 3, with portions broken away, showing a releasable clamping or securing device in a position different from that illustrated in FIGURE 3.

In FIGURE 4, the base of the depending portion 66 of the cap 64 is shown elevated above the upper surface of the fixture 48. The cap 64 may therefore be lowered by an amount sufficient to cause the head 56 to enter completely into the box member 40. To avoid accidental release of the member 46 from the track 40, the opposed ends of the head 56 are turned upwardly at 68 and the internal surface portions of the track or box element 40 forming the sides of the slot 42 are provided with downwardly depending flanges 70 (see FIGURE 2). In this manner, the head 56 must snap over the depending flanges formed in the box member 40, and, accordingly, is firmly retained therein if the member 46 is released. As shown in FIGURES 2 and 3, the cap member 64 may be screwed down tightly into engagement with the top surface of the fixture 48. Once tightened, the head 56 is securely held within the box member 40.

Of course, should it be desired to remove the clamping member 46 from engagement with the box member 40, thus to free the jacking unit 12 so that it may be moved about, the cap 64 is unscrewed to provide a clearance between its base and the top surface of the fixture 48. The member 46 can then be pushed downwardly, rotated by 90°, and then released, whereupon it will return to the position shown in FIGURE 4.

It is thus seen that means have been provided for releasably clamping the jacking units 12 to the floor 10. The clamps are spaced from the wheels 26 to prevent rearward tilting of the units 12. Further, the clamps will resist side-to-side tilting movement of the units 12. The only element embedded in the ground or floor 10 is the rather shallow, track forming box member 40. Since floors of garages and the like are often made of concrete or asphalt, the track, or tracks, can be embedded quite cheaply when the floor is initially poured.

Referring now to FIGURES 5 and 6, another embodiment of this invention is shown as utilizing two tracks formed by a pair of parallel, elongate hollow box members 40 embedded within a floor 10. The construction of the jacking units in FIGURES 5 and 6 is similar to that shown in FIGURES 1 through 4. Accordingly, like reference characters are applied to like parts. In this case, the clamping or locking members 46 are mounted for rotation within the legs 24 of the jacking units 12, which legs may be made from hollow, tubular stock. As shown best in FIGURE 5, one pair of locking members 46 may be placed adjacent the foremost free end portions of the legs 24. If desired, bushings 80 may be mounted within the tubular legs 24 and in encircling relation to the members 46 to aid in maintaining the proper position of the members 46. It is apparent that the use of two spaced members 46 provides even greater stability of the jacking units 12.

To further increase the stability of the jacking units 12, a pair of parallel, rearwardly extending rails 82 are connected to the bases of the stanchions 22. A transverse support leg 84, which is sufficiently long to straddle the members 40, is connected to the rails 82. Locking or clamping members 46 are mounted at the ends of the rails 82 which operate in the same manner as previously described. Additional spring biased casters 86, mounted in spring housings 88, may be connected to the opposite ends of the member 84 adjacent the clamping members 46. The casters 86 may replace the wheels 26 described in connection with the embodiment illustrated in FIGURES 1 through 4.

In FIGURES 7 and 8, a different method of releasably clamping or retaining a plate 52 relative to the floor 10 is shown. In this case, a track is formed by an I-beam clamp receiving member 90 which, but for an exposed top flange 92, is almost entirely embedded within the surface 10. A sliding shoe 94 is connected, as by a pin 96, to a vertically movable rod 146, which is supported on the plate 52 in a manner identical to the locking member 46 described in the embodiments of FIGURES 1 through 4. The operation of this device is believed apparent. When the jacking unit to which this structure is attached is out of engagement with the I-beam 90, the sliding shoe 94 is biased by a spring enclosed within the cap member 64, such that its top surface engages the bottom surface of the fixture 48. Should it be desired to releasably clamp or secure the jacking unit 12 in fixed relation to the floor 10, the sliding shoe 94 is passed over the end of the exposed, upper flange portion 92 of the I-beam 90. The sliding shoe 94 and the jacking unit 12, although secured in fixed relation to the floor 10, may be moved along the I-beam track 90 to the desired position relative to the vehicle to be lifted. As apparent, if an elongate track were to be used, gaps could be formed therein so that it would be unnecessary to move the sliding shoe 94 for considerable distances therealong.

The jacking units 12 have been illustrated as located to the front and rear of the vehicles V. Accordingly, a vehicle V may be aligned such that its longitudinal axis is generally parallel to the longitudinal axis of the particular clamp receiving members to which the clamping units mounted on the jacking units 12 are secured. At the present time, most vehicles are provided with pick-up points adjacent the front and rear of the vehicles such that the jacking units 12 may safely engage these pick-up points. In this manner, most of the underbody of the vehicle is exposed and readily accessible for repair or maintenance operations. It is to be understood, however, that the lift installations described herein may straddle and engage the sides of vehicles having more centrally located pick-up points.

Although the tracks formed by the box members 40 and the I-beam 90 are illustrated herein as being continuous, these elements may be relatively short. It is contemplated that installations will be desired wherein no particular predetermined location for repair of the vehicles is designated. Elongate clamp receiving members would likely be preferred so that the vehicles may be lifted wherever located relative to the clamp receiving members. However, due to considerations of space, there may be only one position for a vehicle, and each clamp receiving element need be made of only such length as necessary to accomodate a single jacking unit 12.

While no structure is described herein for controlling the operation of the jacking units 12, it is to be understood that simultaneous operation of the two jacking units 12 for each lift system may be accomplished in any conventional fashion. If the jacking units 12 are electrically operated, the control system described in the aforementioned application, Serial No. 81,301, may be employed.

Although the presently preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described our invention, we claim:

1. A portable jacking unit for use on a floor having clamp receiving means connected thereto or formed therein or thereon comprising: a frame; a vehicle engaging means mounted for vertical movement upon said frame; a pair of horizontally disposed legs connected to said frame; a clamp support plate connected between said legs; and a clamp slidably mounted on said support plate between said legs adapted to releasably engage said clamp receiving means.

2. The jacking unit of claim 1 wherein said clamp receiving means comprises an I-beam partially embedded within said floor and said clamp includes a shoe adapted to slide along the exposed portion of said I-beam.

3. A vehicle lift installation including at least one jacking unit mounted on roller elements enabling said unit to be positioned where desired; a clamp receiving element at least partially embedded within the floor upon which said jacking unit is located, said clamp receiving element comprising an elongate hollow box member embedded within said floor, said box member having an elongate slot in the upper surface thereof; and at least one clamping member mounted on said one jacking unit, said clamping member including a rod having a T-head adapted to enter said box member through said slot whereby said jacking unit may be releasably clamped in fixed position relative to said floor.

References Cited by the Examiner

UNITED STATES PATENTS

| | | |
|---|---|---|
| 1,350,970 | 8/1920 | Hutchinson et al. |
| 2,099,636 | 11/1937 | Weaver _____ 187—8.45 |
| 2,239,125 | 4/1941 | Summers. |
| 2,282,621 | 5/1942 | Thompson _____ 214—46.34 |
| 2,349,911 | 5/1944 | Neighbour et al. ___ 214—46.34 |
| 2,576,907 | 11/1951 | Wallace _____ 187—8.45 |
| 2,677,503 | 5/1954 | Bodkin. |
| 2,909,358 | 10/1959 | Southerwick. |
| 3,024,925 | 3/1962 | Werner et al. |

WILLIAM FELDMAN, *Primary Examiner.*

O. M. SIMPSON, *Assistant Examiner.*